UNITED STATES PATENT OFFICE.

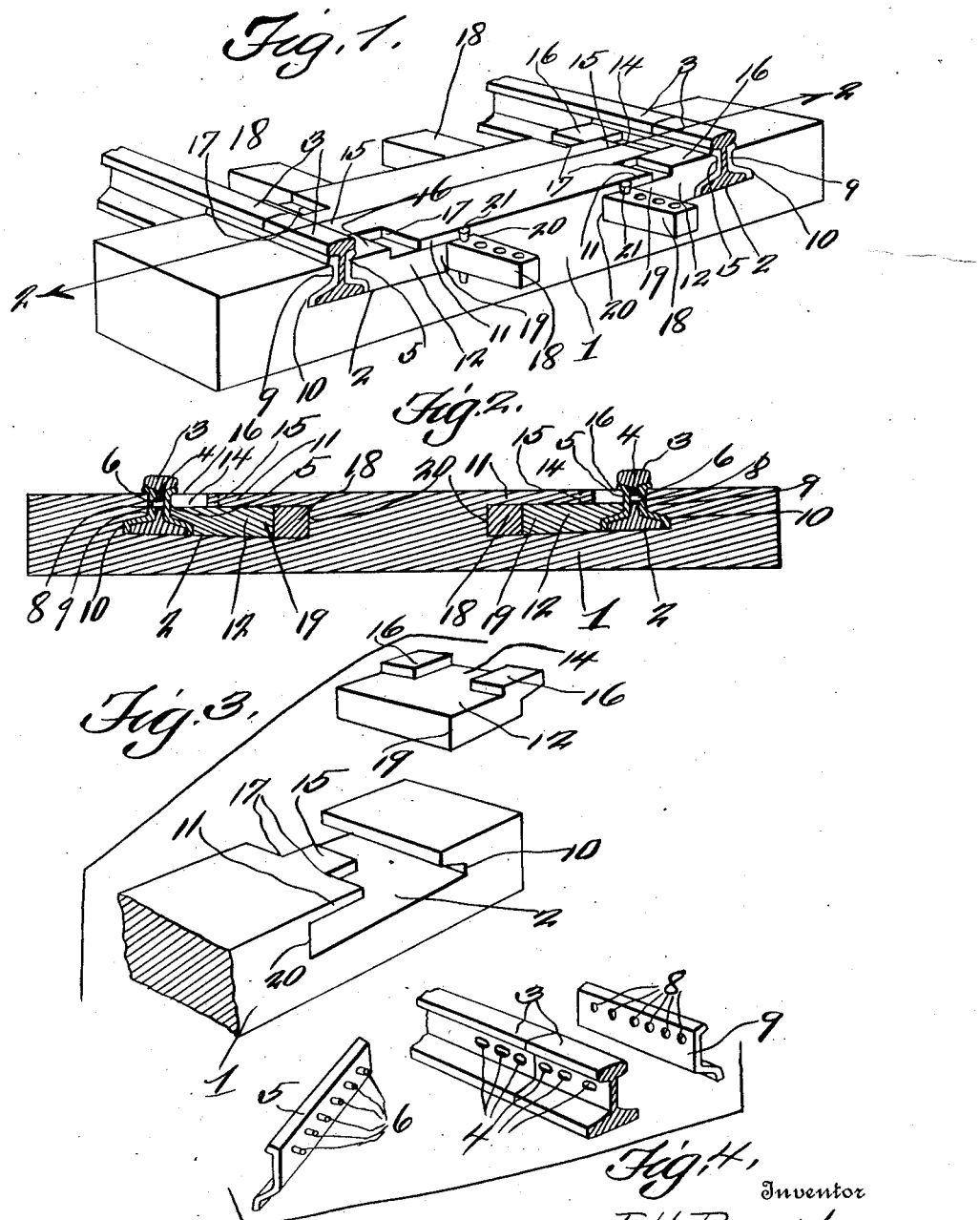

JAMES HENRY BROWDER, OF McKENZIE, ALABAMA.

COMBINATION RAIL-JOINT AND RAIL-CLAMP.

1,093,682.

Specification of Letters Patent. Patented Apr. 21, 1914.

Application filed October 11, 1913. Serial No. 794,547.

*To all whom it may concern:*

Be it known that I, JAMES H. BROWDER, a citizen of the United States, residing at McKenzie, in the county of Butler and State of Alabama, have invented a new and useful Combination Rail-Joint and Rail-Clamp; and I do hereby declare the following to be a full, clear, and exact description of the invention, such as will enable others skilled in the art to which it appertains to make and use the same.

This invention relates to a new and useful combination rail clamp and rail joint.

One of the features of the invention is the provision of a pair of fish plates, one having lugs entering opening of the adjoining rails to engage recesses in the opposite fish plate. The rail supporting tie having a recess having an undercut wall with which one of the fish plates engages, and a sliding block having a tongue and groove connection with the other wall of said recess to engage the other fish plate, so as to clamp both fish plates against the opposite faces of the rails, there being a key for holding the block in place.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings: Figure 1 is a view in perspective showing a section of a railroad illustrating the improved rail joint and rail clamp. Fig. 2 is a sectional view on line 2—2 of Fig. 1. Fig. 3 is a detail view of the tie, showing the block ready to be inserted in the recess of the tie. Fig. 4 is a detail view showing the two fish plates ready to be connected to the adjoining rails.

Referring more particularly to the drawings, 1 designates a rail tie, each end of which is constructed with a recess 2, the bottom of which is inclined downwardly toward the center between two rails.

The adjoining rails 3 are provided with openings 4. The fish plates 5 which are on the inner side of the rails are constructed with lugs 6 which enter the openings 7 of the adjoining rail. These openings are a little larger or elongated in length, so as to allow a little play for the rails, in order to allow for expansion and contraction of the rail. These lugs 6 after passing through the openings 7 engage the recesses 8 of the fish plates 9, which are disposed upon the outer faces of said adjoining rails. The end wall 10 of each recess 2 is undercut and correspondingly shaped to fit each fish plate 9. The object of inclining the bottoms of the recesses 2 is to throw the rails toward one another slightly. The other end of each recess 2 is constructed with an overhanging flange 11 to overlie the sliding block 12, which slides under the flange 11. Each block 12 at the end 13 is shaped to correspond with the contour of each fish plate 5 so as to fit thereagainst. Each block 12 is constructed with a groove 14 to receive the tongue 15 of the flange 11, so as to prevent lateral movement of the block 12. The raised portions 16 on each side of the groove 14 engage the recesses 17 adjoining the tongue 15 and flange 11. Keys 18 are provided to be received between the ends 19 of the blocks and the ends 20 of the recesses 2, to force blocks against the fish plates 5, in order to clamp the fish plates against the adjoining rails owing to the walls 10. Pins 21 extend transversely of the keys 18 to hold them in place.

The invention having been set forth, what is claimed as new and useful is:—

In combination, a pair of adjoining rails including means for connecting them, a rail tie having a recess, the end wall of which overlies a portion of the rail connecting means, the other wall of said recess having an overlying T-shaped flange extending toward the rails, a clamping block slidably mounted in said recess having a flange overlying the other part of the rail clamping means, the upper face of said clamping block having a recessed out portion corresponding in shape to slidably fit the overlying T-shaped flange, a wedge for tightening the clamping block in place interposed between the block and the end wall of the recess having said T-shaped flange, and means for locking the wedge in place.

In testimony whereof I have signed my name to this specification in the presence of two subscribing witnesses.

JAMES HENRY BROWDER.

Witnesses:
 ELBERT T. HOLLOWAY,
 JOHN H. BEASLEY.